United States Patent [19]

Patin

[11] 4,006,916
[45] Feb. 8, 1977

[54] LOCKABLE ARTICULATION

[75] Inventor: Pierre Patin, Paris, France

[73] Assignee: Agence Nationale de Valorisation de la Recherche (ANVAR), Neuilly-sur-Seine, France

[22] Filed: July 1, 1975

[21] Appl. No.: 592,177

[30] Foreign Application Priority Data

July 5, 1974 France .................... 74.23406

[52] U.S. Cl. .................. 280/282; 180/27; 188/140 A; 188/190; 403/84
[51] Int. Cl.² .............. B62K 5/04; F16D 51/60
[58] Field of Search ............ 280/400, 282, 112; 180/27; 188/136, 140 A, 82.8, 82.84, 331, 329, 328, 330, 326, 190; 403/84

[56] References Cited

UNITED STATES PATENTS

| | | | |
|---|---|---|---|
| 1,564,515 | 12/1925 | Bower | 188/329 X |
| 2,426,135 | 8/1947 | Yost | 188/326 |
| 3,698,502 | 10/1972 | Patin | 180/27 |
| 3,781,031 | 12/1973 | Patin | 180/27 |

Primary Examiner—Philip Goodman
Assistant Examiner—John A. Pekar
Attorney, Agent, or Firm—Cameron, Kerkam, Sutton, Stowell & Stowell

[57] ABSTRACT

A lockable articulation for permitting relative angular rotation between a first and a second part, such for example as the body of a three-wheeled vehicle and the rear axle of the vehicle, said articulation comprising a hollow cylindrical drum centered and mounted on one part, e.g. the axle, two cylindrical sector-shaped jaws arranged inside the drum for contacting the inner surface of the drum and with their ends facing each other, at least two facing ends defining dihedral surfaces whose angle is outwardly opening, and means coupled to the other part, e.g. the vehicle body, for spreading the jaws apart into frictional engagement with the drum to lock the other part against rotation relative to the one part, said means including a roller interposed between the drum wall and the dihedral surface of the jaws and a knee lever having two-pivotally connected links one of which is pivotted on the other part and the other of which rotatably supports the roller.

15 Claims, 8 Drawing Figures

LOCKABLE ARTICULATION

The present invention is concerned with a lockable articulation to be arranged between two parts mounted to be able to rotate with respect to one another about an axis.

The invention is particularly but not exclusively applicable to statically and dynamically balanced three-wheeled vehicles as described in French Pat. No. 1,562,248 and U.S. Pat. No. 3,698,502. The articulation in accordance with the invention may however have other applications.

In such a three-wheeled vehicle the rear axle is articulated to the body. The advantage of this vehicle is that it can be driven like a two-wheeled vehicle, with the facilities arising from the driver leaning to one side or the other on bends. The articulation may, however, be locked at low speed, the vehicle then having the stability of a tricycle. This enables the vehicle to be provided with a body since it is no longer necessary for the driver to put a foot on the ground when the vehicle is at rest. The locking of the articulation must therefore be controlled as a function of the speed of the vehicle so as to free the articulation when the speed is sufficient to ensure balance, and conversely to cause locking of the articulation when the speed falls below a certain limit. It has been proposed that the articulation be locked by means of a pendulum device subject to centrifugal forces and which controls the locking when the axial plane of the vehicle departs from the apparent vertical direct.

In the above referred to patents a number of locking devices have been described. These devices on the whole give satisfaction but have certain disadvantages particularly that of not always ensuring certainty of locking or unlocking in the event, for example, of rapid manoeuveres as well as sufficiently progressive action.

It is an object of the invention to provide an arrangement ensuring very effective but progressive locking which may also easily be provided with safety devices capable of coming into operation in an emergency.

According to the present invention there is provided a lockable articulation arranged between a first part and a second part mounted for relative rotation about a first axis and comprising:

a hollow cylindrical drum centered on said axis and fast with said first part;

two jaws arranged inside said drum, each jaw having the form of a cylindrical sector and provided with a friction surface for bearing against the inner surface of the wall of said drum, said jaws being arranged with one end of each said jaw bearing against one end of said other jaw and said other ends of said jaws spaced apart and defining dihedral bearing surfaces, the angle between said dihedral bearing surfaces opening outwardly of said drum; and means for locking said first and second parts against relative rotation and operable to spread said jaws apart, said locking means comprising:

at least one roller interposed between said inner surface of said wall of said drum and said dihedral surfaces of said jaws for spreading said jaws apart; and at least one hinged lever means forming a knee and comprising a first and a second link, said first link being pivotted on said second pair and on said second link and said second link bearing said roller; wherein said dihedral bearing surfaces, said pivotal axes of said lever means and the axis of said roller are parallel with said axis of relative rotation of said first and second parts.

The invention will be more fully understood from the following description of embodiment thereof, given by way of example only, with reference to the accompanying drawings.

Figure 1:
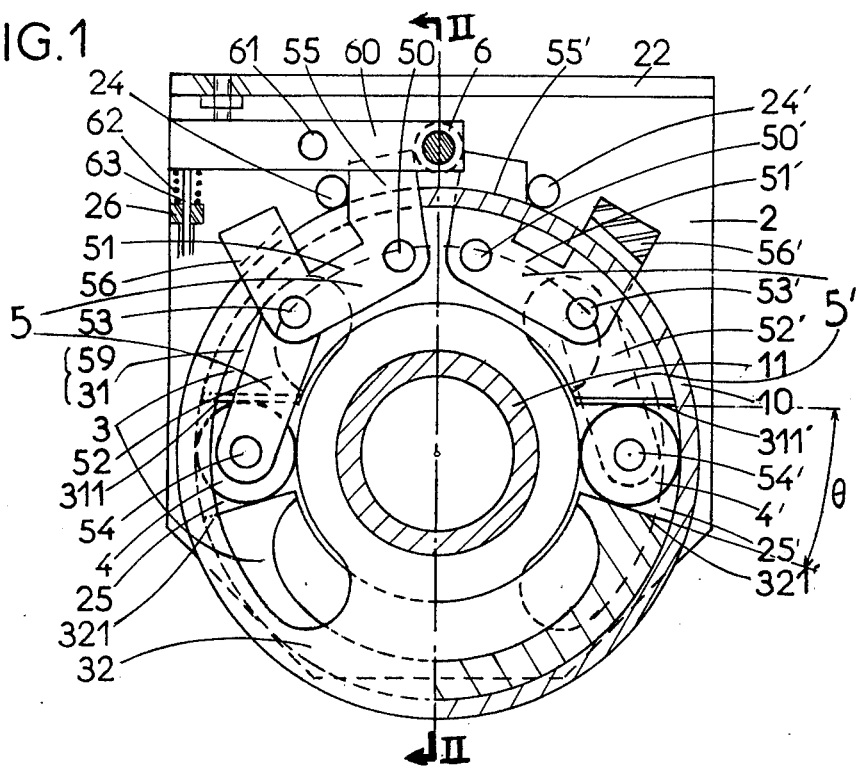
FIG. 1 is a transverse section through a first embodiment of the invention.
Figure 2:
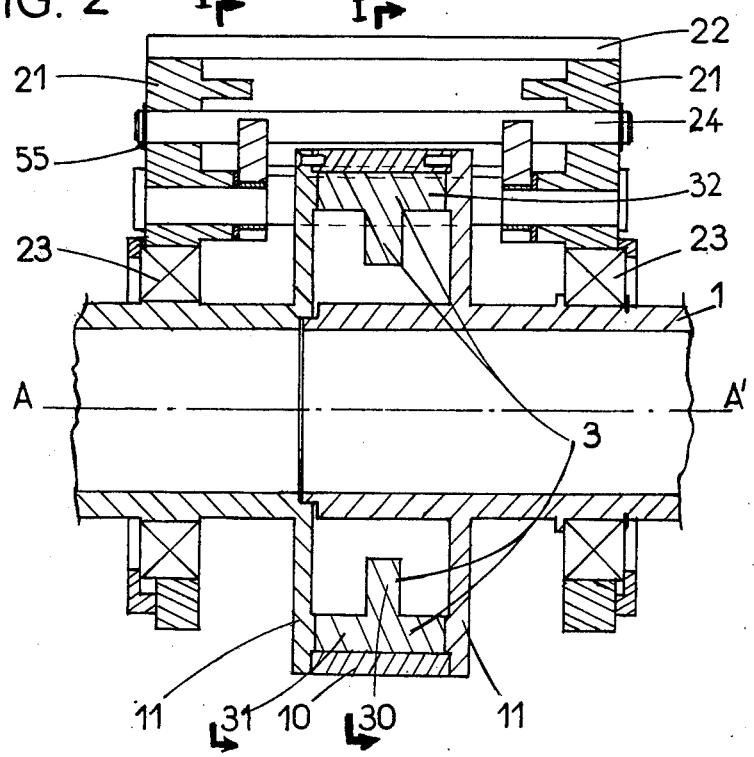
FIG. 2 is an axial section along the line II—II in FIG. 1.

As will be seen in FIGS. 1 and 2, an articulation comprises two parts 1 and 2 mounted for rotation with respect to one another. As shown, the part 1 consists of a cylindrical shaft on which is fixed a drum 10. The part 2 consists of a stirrup composed of two cheek-plates 21 connected by a spacer 22 and mounted for rotation about the shaft 1 by means of bearings 23. The drum 10 comprises a cylindrical wall coaxial with the shaft 1 and connected to the latter by cheek-plates 11.

Inside the drum are located two jaws 3 each having the shape of a semi-cylindrical sector and provided on their outer surfaces with friction linings against the inner wall of the drum 10. Each jaw advantageously has a central rib 30. As shown, the two jaws are located on opposite sides of the horizontal plane passing through the axis and are symmetrical each with respect to the vertical plane passing through the axis. Thus the upper jaw is referenced 31 and is distinct from the lower jaw referenced 32. Each jaw is furnished at its ends with plane bearing-surfaces 311 and 311' respectively at the right and left ends of the jaw 31 as viewed in FIG. 1, and 321 and 321' to right and left of the jaw 32.

The facing bearing-surfaces of the two jaws 31, 32 are separated by a gap and thus from between them two dihedra spaced by an angle 0, inside which are located two rollers 4, 4', respectively to the left and right of the plane of symmetry of FIG. 1. Each roller 4, 4', is mounted at the end of a lever 5, 5' hinged at its other end to the rotary part 2 about an axis 50, 50'. The two levers 5, 5' extend symmetrically on opposite sides of the vertical plane of symmetry. Each lever 5, 5' consists of a link 51, 51' and a small link 52, 52' hinged together about an axis 53, 53', the link 51, 51' being hinged about the axis 50 to the rotary part 2 and the small link 52, 52' bearing at its end the roller 4, 4'. The hinged levers 5, 5' are locked against movement in a direction widening the angle formed between the links and thus constitute knees. This locking may be obtained, for example, by pins 24, 24' fixed to the rotary part 2 and against which arms 55, 55' integral with the links 51, 51' bear. It will be seen that in this way displacement of the axes 53, 53' towards the axis of the drum is limited so that the hinged levers form a polygon inscribed inside the drum.

In order to obtain parallelism of all the axes, each knee is composed of a pair of links 51, 51' and small links 52, 52' framing the jaw along which they extend, as has been illustrated in FIG. 1, the left hand portion of which is a half-section in front of the knee and the righthand portion is a half-section in the transverse plane of symmetry of the drum. As the hinge axes 53, 53' of the knees are preferably located at a distance from the axis of the shaft 1 less than the radius of the wall of the drum, each pair of levers 5, 5' is integrated by at least one spacer 56, 56' located outside the drum, extending parallel with the axis of the drum and connecting two arms integral with the links 51, 51' and extending perpendicular to the links 51, 51' at the level of the hinge axis 53, 53'. The axes of 54, 54' of the rollers 4, 4' connecting the ends of each pair of links 52, 52' pass through four oblong circular openings 25 in the cheek-plates 21 of the rotary part 2.

Figure 3:
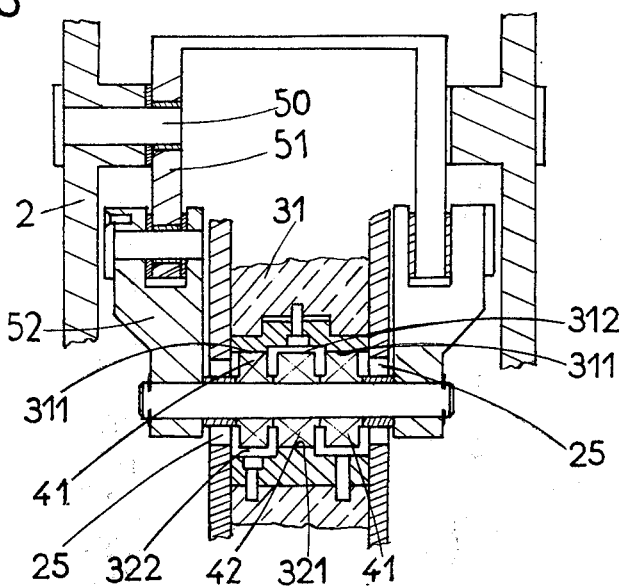
FIG. 3 is a section along the line III—III in FIG. 1.

Each roller 4, 4' (FIG. 3) is composed of at least two coaxial wheels each bearing against one of the faces of the corresponding dihedron. Each bearing surface will have a width limited to that of the corresponding wheel and will be extended by recesses corresponding with the other wheel. For the sake of symmetry it is preferred that the rollers 4, 4' each be composed of three wheels as shown in FIG. 3 in respect of roller 4. The middle wheel 42 bears against the face 321 of the jaw 32, the width of which is limited to that of the wheel, and is framed by two wheels 41 which bear against faces 311 of corresponding width on the jaw 31, the ends of the jaws 31 and 32 having recesses 312 and 322 respectively corresponding to the wheels which do not bear against them. Thus each wheel of the roller 4 bears only on one jaw.

Figure 4:
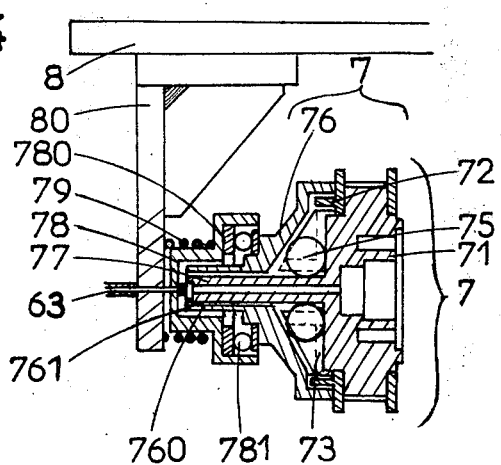
FIG. 4 is a section through a device for control of the locking of the articulation of the embodiment of FIG. 1.
Figure 4A:
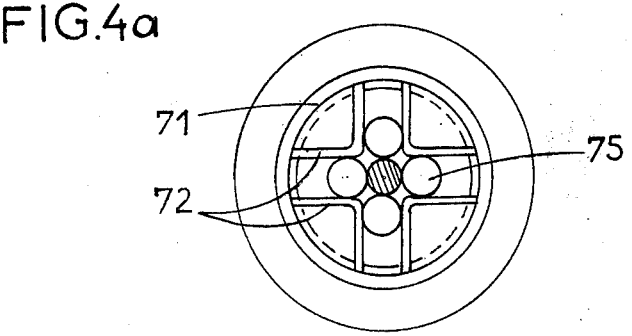
FIG. 4b is a view along the line IV—IV in FIG. 4.

Finally, the articulation comprises a means of locking and unlocking the knees. As shown this locking means comprises a wheel 6 mounted at the end of a lever 60 hinged on the part 2 about an axis 61. The lever 60 is biased by a spring 62 bearing against a portion 26 of the part 2, in a direction to urge the wheel 6 between the arms 55 and 55' of the two knees. The opposing action of a cable 63 tends to disengage the wheel 6 from the arms 55, 55'. The disengagement cable 63 is actuated by a control device illustrated in FIG. 4. This control device comprises a centrifugal governor 7 driven by a pulley 71 the speed of which is in constant ratio to that of one of the two rear wheels of the vehicle. The pulley 71 includes a cheek-plate perpendicular to the axis of the governor and integral with a crown 72. A spider 73 is fixed onto the pulley by screws. From FIG. 4a, it will be seen that the spider forms four radial slides in which four balls 75 move. The whole is covered by a conical cup 76, the central portion of which is extended by a sleeve 760 provided with splines 761 which slide along corresponding splines on a shaft 77 extending the body of the pulley 71. The whole is closed by a cover 78 provided with a ball thrust-bearing 780 forced outwards by a spring 79 bearing against an element 80 of frame 8. The cover 78 is attached to the end of the cable 63 which is surrounded by a sheath bearing at its two ends against the frame 8. The pulley 71 is mounted on a shaft (not shown) fixed to the frame. Thus when it is rotated by the wheels of the vehicle, the balls 75 being subjected to the action of a centrifugal force each have a tendency to move away from the axis along a radial slide, so thrusting the cover 76 back against the action of the spring 78. The cable 63 thus being slackened allows the spring 62 to thrust the wheel 6 between the arms 55, 55' and thus lock the knees which then behave as unhinged levers. When the speed falls below a certain value the spring 79 will thrust the cover 76 back, so stretching the cable 63 against the action of the spring 62, the effect of which is to disengage the wheel 6 from the arms 55, 55' to unlock the knees. To do this it is sufficient for the spring 79 to have a strength greater than the spring 62.

Figure 7:
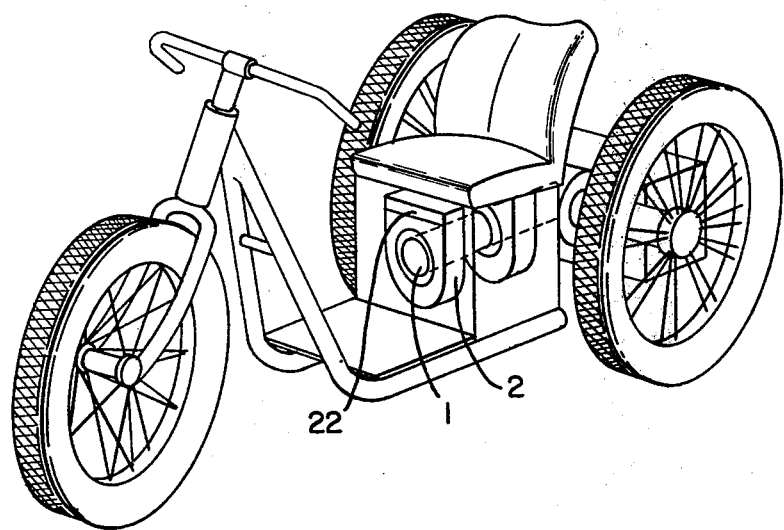
FIG. 7 is a view of the lockable articulation of the present invention ranged between the rear axle and the body of a three-wheeled vehicle.

Operation of the above described articulation will now be described. As has already been mentioned the above described device is particularly applicable to a three-wheeled vehicle as described in U.S. Pat. No. 3,781,031 and as seen in FIG. 7. In this application the shaft 1 is integral with the rear axle and the stirrup 2 is connected to the front portion of the body of the vehicle which includes particularly the driver's seat. Thus when the articulation is unlocked the driver can incline the body of the vehicle with respect to the axle from one side to the other on bends, in order to keep the body in the plane of the apparent vertical. When the speed of the vehicle is less than the value at which balance is no longer ensured, the articulation locks itself and the vehicle behaves like a tricycle, the spacing between the rear wheels giving it sufficient stability.

As has already been indicated, when the speed of the vehicle is sufficient the centrifugal governor 7 exerts a thrust on the cap 76 which has the effect of slackening the cable 63, the wheel 6 then being urged between the arms 55 under the action of the spring 63. The arms 55 are thus pushed against the stops 24 by the wheel 6 and the links 51, 51' are locked. Under these conditions, if the part 2 has a tendency to incline to the right, for example, turning about the axis A–A', the roller 4' receives a thrust transmitted by the locked knee lever 5' and in turn transmits this thrust to the jaw 32 bearing against the inner wall of the drum. The roller 4 on the left of the axis A–A' is itself driven by the knee lever 5 and exerts a thrust against the upper jaw 31 which is not communicated to the roller 4', since this escapes by rotating about the axis of the shaft 1. Everything consequently happens as if the jaws 31 and 32 were integral with the stirrup 2, each jaw receiving a thrust without being held by the roller which itself is being driven in rotation about the axis by the inclination of the stirrup 2. Hence no force is exerted to separate the jaws and they slide with low friction along the inner wall of the drum. The articulation is thus unlocked the body of the vehicle can be inclined to one side or the other about the vertical plane of symmetry.

When on the contrary the speed falls below a predetermined value, the balls 75 return towards the axis of the centrifugal governor and allow the cover 76 to separate from the element 80 of the frame 8 under the action of the spring 79, so tensioning the cable 63. The wheel 6 is thus raised and the knee levers 5 and 5' are unlocked, so that each can close up. Under these conditions if the body inclines to the right, bringing about a rotation of the stirrup 2 about the axis A–A' (FIG. 1), the wheel 4' which bears against the inner wall of the drum is no longer driven by the stirrup 2, no thrust being transmitted by the knee lever 5' which has a tendency to fold up. The lower jaw 32 in turn receives no thrust tending to make it turn with the stirrup 2. The knee lever 5 located to the left of the articulation remains because the arm 55 bears against the pin 24.

Hence the wheel 4 is driven by the rotation of the stirrup 2 in a direction passing through the axis 50. The bearing surface 311 on the jaw 31 is inclined with respect to this direction so as to allow displacement of the wheel 4 inwards. This displacement has a tendency to open the dihedron formed by the bearing surfaces 311 and 321, a thrust being exerted on the jaw 32 in an anticlockwise direction. The two jaws thus have a tendency to separate from one another by bearing against the wheel 4' located to the right of the articulation. This separation of the jaws tends to lock the articulation and prevent inclination of the stirrup 2. Of course the operation of the articulation is symmetrical and if the stirrup 2 inclines to the left the knee 5 tends to fold up and not to transmit thrust to the roller 4 whereas the roller 4' tends to move towards the axis of the drum, so opening the dihedron formed by the surfaces 311' and 321', this separation of the jaws producing locking of the articulation.

Thus when the knee levers are unlocked any rotation of the stirrup 2 with respect to the shaft 1 due to inclination of the body of the vehicle in one or other direction with respect to the rear axle is immediately prevented by separation of the jaws. The locking torque is proportional to the rotating torque in a ratio higher than unity and consequently the articulation cannot be unlocked whatever the torque exerted. On the other hand when the knee levers are locked the articulation is entirely free.

In the embodiment which has just been described the thrust wheel 6 is interposed between the arms 55 and 55' so that the knee levers are locked or unlocked simultaneously. It can be seen that it would be a simple matter for locking to be effected separately on the knee levers so that the articulation could be free in one direction of rotation and locked in the opposite direction.

Figure 5:
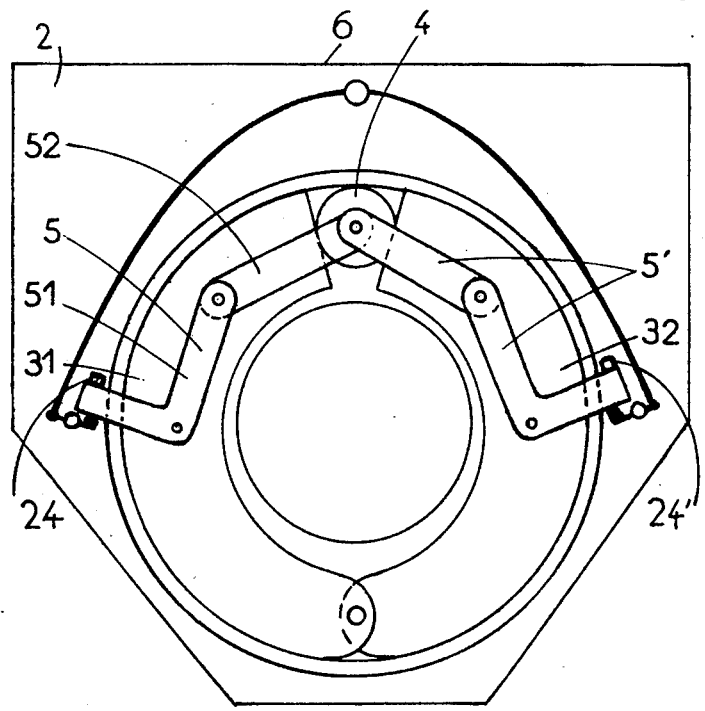
FIG. 5 is a diagrammatic view in cross-section of another embodiment of the invention.

Again, the articulation which has just been described includes two rollers for spreading the jaws, but it can operate equally well with a single roller as has been indicated very diagrammatically in FIG. 5.

In this embodiment the two jaws 31 and 32 are symmetrical with respect to the vertical plane passing through the axis A-A' and bear against one another at their bottom parts, for example, by a hinge. At the top part the facing surfaces of the two jaws are separated from one another and form a dihedron in which a roller 4 is interposed. The axis of the roller 4 is provided at the ends of two levers 5 and 5' arranged symmetrically on opposite sides of the vertical plane of symmetry. Each lever is composed of a link 51 hinged onto the stirrup 2 and extended by a small link 52 and is locked in the opening direction of the two links so as to behave like a knee. This locking may be obtained in any convenient manner, for example, as shown by stops 24, 24' against which arms 55, 55' integral with the links bear. As before, it is possible to lock the knees by means of a member 6 acting on one or other of the arms 55, 55'.

Operation of this device is similar to the device described with respect to FIGS. 1 to 4. When the stirrup 2 has a tendency to turn about the axis A-A' to right or left, if the knee levers are locked the wheel 4 receives from the levers 5 and 5' a thrust and a pull which balance out and it rolls along the inner wall of the drum 10. If on the contrary the knee levers are unlocked and can close up, or at least that one lever which had a tendency to thrust against the wheel, the latter is subjected solely to the pull of the knee lever lying to the side towards which the stirrup is turning. This pull which is no longer balanced by a thrust of the same order has a tendency to make the wheel 4 move towards the axis A-A', so opening the jaws and locking the articulation.

Figure 6:
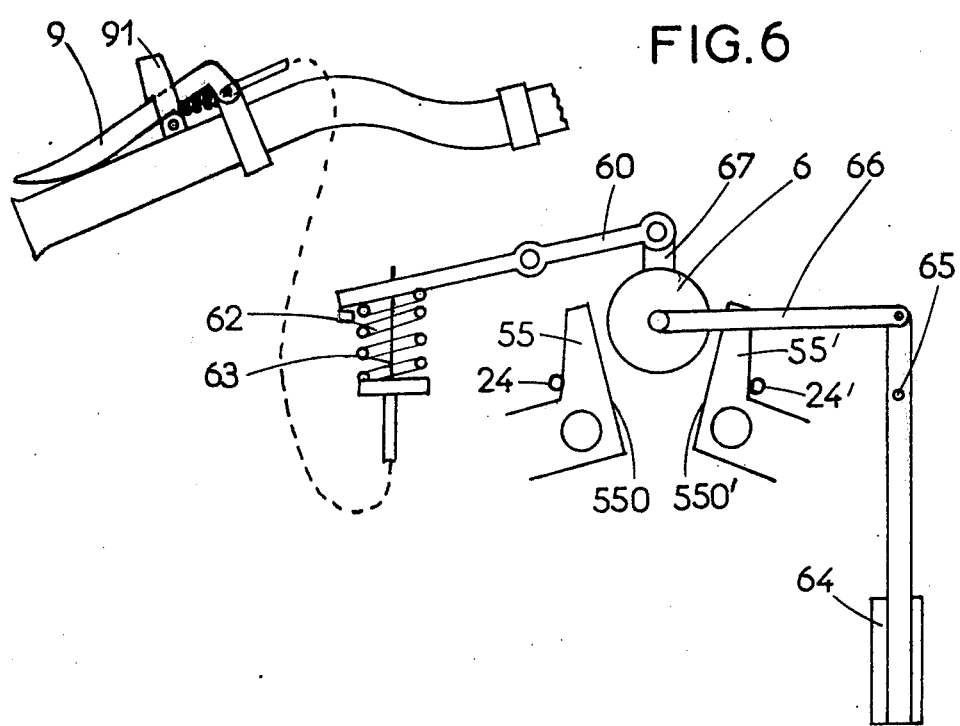
FIG. 6 is a view of another form of control device and a safety device.

In FIG. 6 there is illustrated a simplified means of control of the locking and unlocking of the knee levers. In this embodiment the centrigual governor 7 is replaced by a simple handle 9 controlled, for example, by the driver's left hand.

When the vehicle is running at a speed which gives it natural balance, the driver releases the handle and the wheel 6 pushes the arms 55 against the stops 24, the knee levers being thereby locked. The articulation is therefore free and the vehicle can be inclined to one side or the other on bends.

When the vehicle speed drops to such a level that balance is no longer ensured, the driver squeezes the handle down, which has the effect of releasing the wheel 6 and unlocking the knee levers. The articulation then locks when the vehicle inclines to one side or the other. At rest the handle is held down by a spring-loaded pawl 91. When the vehicle starts, the driver can free the pawl and release the handle as soon as he judges the speed is sufficient.

It can be seen that this simplified device may be as effective as that which was described previously, the advantage of the latter being that of controlling unlocking of the knee levers automatically at a predetermined speed.

In FIG. 6 there is also illustrated a safety device which may also be applied without modification to the embodiment of FIG. 1.

This device comprises a pendulum 64 consisting of a mass mounted at the end of a lever hinged about an axis 65 integral with the frame. The pendulum 64 is connected to the axis of the wheel 6 by a link 66.

The mass of the pendulum 64 and the lever arms acting on the wheel 6 are selected as a function of the strength of the spring 62 and taking into account the inclination of the bearing surfaces 550 and 550' on the arms 55 so that for sufficient inclination of the pendulum the wheel 6 can be raised by rolling on one of the surfaces 550 or 550' against the action of the spring 62. This device operates in the following manner:

For safety reasons the wheel 6 is so mounted that in the event of trouble in the control device the articulation is unlocked. In the event, for example, of fracture of the cable 63 the spring 62 pushes up the lever 60 which lowers the wheel 6 between the arms 55 and locks the knees, the articulation then being free. This arrangement is in fact more safe when the vehicle is travelling, because inopportune locking of the articulation might be dangerous especially on a bend. However, in order that the driver shall not have to put a foot on the ground the articulation must be able to lock again when the speed is no longer sufficient for keeping the balance. This is the role of the pendulum 64. When the vehicle inclines to one side or the other, for example, to the right the pendulum has a tendency to shift the wheel to the side opposite to the inclination, so disengaging the small link of the knee lever which has to fold in in order to allow locking of the articulation, the wheel being raised by rolling against the bearing surface 550 of the knee lever located at the opposite side.

The pendulum also has an action when the vehicle is travelling at normal speed and the knee levers are locked. The pendulum should always remain in the plane of the apparent vertical, that is to say, that in which the driver must keep his vehicle on bends. If as the result of a mistake by the driver the vehicle departs too much from the plane of the apparent vertical the inclination of the pendulum tends to disengage the knee lever which folds up and thus locks the articulation, which restores stability to the vehicle.

It will be understood that it is simple to calculate the pendular mass as a function of the lever arms and the strength of the spring 62 so that the device acts solely starting from an inclination of a predetermined angle with respect to the apparent vertical.

It will be understood that the invention is not intended to be restricted to the details of the embodiments which have been described by way of example only. Thus the two variants which have been proposed in FIGS. 1 and 5 could be combined by employing two wheels mounted each at the end of two knee levers extending on opposite sides of the axis of the wheel. There would then be four knee levers forming a chain about the axis of the articulation. This arrangement might be advantageous especially for transmitting torque.

While, an articulation has been described particularly for a vehicle as described in the above referred to Patent, it will be appreciated that it could be employed in any circumstance where an articulation must be free under certain conditions of operation and locked under others. This is the case in particular for articulations which have to be free in one direction of rotation and locked in the opposite direction. Such, for example, as the doors of exhibition rooms which must be free in the exit direction whilst preventing admission. It will be observed, moreover, that in the case in which the articulation must always be free in one direction and locked in the other the single-wheel system as shown in FIG. 5 may be employed with a single knee lever locked solely in the direction of widening the angle formed by the two links which compose it. That is, in this case the knee would straighten in one direction of rotation, driving the wheel round and causing opening of the jaws and locking of the articulation whereas in the other direction the knee in folding up would not oppose the rotation of the articulation, at least by a certain angle.

The pendular safety device may act directly on the knee levers, for example, by means of hinged links.

Finally it will be appreciated that the components of the devices which have been described may be replaced by equivalent means.

What is claimed is:

1. A lockable articulation arranged between a first part and a second part mounted for relative rotation about a first axis and comprising:
    a hollow cylindrical drum centred on said axis and fast with said first part;
    two jaws arranged inside said drum, each jaw having the form of a cylindrical sector and provided with a friction surface for bearing against the inner surface of the wall of said drum, said jaws being arranged with one end of each said jaw adjacent one end of said other jaw and said other ends of said jaws spaced apart and defining dihedral bearing surfaces, the angle between said dihedral bearing surfaces opening outwardly to said drum; and
    means for locking said first and second parts against relative rotation and operable to spread said jaws apart, said locking means comprising:
        at least one roller interposed between said inner surface of said wall of said drum and said dihedral surfaces of said jaws for spreading said jaws apart; means for moving said roller including at least one hinged lever means forming a knee and comprising a first and a second link, said first link being pivoted on said second part and on said second link and said second link bearing said roller;
    wherein said dihedral bearing surfaces, said pivotal axis of said lever means and the axis of said roller are parallel with said axis of relative rotation of said first and second parts.

2. An articulation as claimed in claim 1, wherein said bearing surfaces are inclined with respect to the straight line joining the axis of pivotting of said first part on said second part with the axis of said roller interposed between said bearing surfaces.

3. An articulation as claimed in claim 1, wherein said spreader roller is mounted at the ends of the second links of two lever means extending along one jaw on opposite side of said roller.

4. An articulation as claimed in claim 1, comprising two spreader rollers each located between dihedral bearing surfaces defined by the ends of said jaws, and a pair of hinged lever means forming knees and each extending along one of said jaws on opposite sides of the plane of symmetry of said jaws, each roller being mounted at the end of one of said lever means, one of said rollers serving as a bearing point for one of said jaws upon said other jaw when said jaws are being spread apart by said other roller and vice versa in dependence on the direction of rotation of said articulation.

5. An articulation as claimed in claim 1, comprising two spreader rollers and two pairs of hinged lever means extending along said jaws, each roller being mounted on the ends of a pair of second links extending on opposite sides of said roller.

6. An articulation as claimed in claim 1, wherein said locking means includes a stop mounted on said second part and against which said first link bears in the direction of straightening of said knee, and a movable member operable to thrust said second link against said stop.

7. An articulation as claimed in claim 6, wherein said second link is provided with an arm for bearing against said stop.

8. An articulation as claimed in claim 6, wherein said movable thrust member is a wheel mounted on the end of a lever hinged on said second part, said lever being subject to the action of a resilient thrust member, for urging said wheel against said second link and said second link against said stop, and to the opposing action of a device for disengaging said wheel from said first link.

9. An articulation as claimed in claim 8, wherein said disengaging device comprises a cable connected to said lever and means for controlling rotation of said lever by tensioning said cable against the action of said resilient thrust member.

10. An articulation as claimed in claim 9, mounted on a vehicle wherein said means for controlling rotation of said lever comprises a resilient tensioning member for exerting on said cable a force greater than that of said resilient thrust member, and a centrifugal governor for controlling the reduction of the tension in said cable by compression of said resilient tensioning member at a predetermined speed of said vehicle, said centrifugal governor being controlled in rotation by the driving axle of said vehicle.

11. An articulation as claimed in claim 9 mounted on a vehicle, wherein said means for controlling rotation of said lever comprises a handle for disengagement of said wheel by tensioning said cable, said handle being actuated by the driver of said vehicle.

12. An articulation as claimed in claim 1, wherein the or each hinged lever means comprises a pair of first links and second links framing said jaw along which said lever means extends, said links being connected by at least one spacer extending outside said drum.

13. An articulation as claimed in claim 1, wherein said spreader roller comprises at least two coaxial wheels each bearing against one of said dihedral surfaces, and each bearing surface has a width limited to that of the corresponding said wheel, said ends of said jaws having recesses corresponding to the or each of the other said wheels.

14. An articulation as claimed in claim 1, wherein said second part is a stirrup comprising two cheek-plates connected by a spacer and framing said drum, each said cheek-plate being rotatably mounted by means of a bearing about a shaft fixed relative to said drum, said first part comprising said shaft.

15. An articulation as claimed in claim 1, arranged between the rear axle and the body of a three-wheeled vehicle, said axle constituting said first part bearing said drum and said second part being connected to said body.

* * * * *